(12) United States Patent
Jamshidi-Roudbari et al.

(10) Patent No.: US 8,731,491 B2
(45) Date of Patent: May 20, 2014

(54) INTERFERENCE REDUCTION SYSTEMS AND METHODS

(75) Inventors: Abbas Jamshidi-Roudbari, Sunnyvale, CA (US); Cheng-Ho Yu, Cupertino, CA (US); Moon Jung Kim, Palo Alto, CA (US); Shih Chang Chang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 261 days.

(21) Appl. No.: 13/217,902

(22) Filed: Aug. 25, 2011

(65) Prior Publication Data

US 2013/0052971 A1    Feb. 28, 2013

(51) Int. Cl.
   *H04B 1/04* (2006.01)
(52) U.S. Cl.
   USPC ........... 455/114.2; 455/78; 343/700; 343/702
(58) Field of Classification Search
   USPC ...................................................... 455/114.2
   See application file for complete search history.

(56) References Cited

U.S. PATENT DOCUMENTS

| | | | |
|---|---|---|---|
| 6,366,114 B1 | 4/2002 | Liu et al. | |
| 7,701,277 B2 | 4/2010 | Toffolon et al. | |
| 7,786,761 B2 | 8/2010 | Lin | |
| 7,812,583 B2 | 10/2010 | Xi et al. | |
| 7,825,862 B2 * | 11/2010 | Cheng et al. | 343/702 |
| 2007/0236397 A1 * | 10/2007 | Cheng et al. | 343/702 |
| 2009/0309633 A1 * | 12/2009 | Kotowski et al. | 327/108 |
| 2010/0253638 A1 | 10/2010 | Yousefpor et al. | |
| 2012/0008240 A1 * | 1/2012 | Jiang et al. | 361/54 |
| 2012/0009887 A1 * | 1/2012 | Sanguinetti et al. | 455/78 |

FOREIGN PATENT DOCUMENTS

KR    2007091244 A    9/2007

OTHER PUBLICATIONS

Jinwen Xiao, et al.; "A 4-μA Quiescent-Current Dual-Mode Digitally Controlled Buck Converter IC for Cellular Phone Applications," IEEE Journal of Solid-State Circuits, vol. 39, No. 12; Dec. 2004, pp. 2342-2348.

* cited by examiner

*Primary Examiner* — Ajibola Akinyemi
(74) *Attorney, Agent, or Firm* — Fletcher Yoder PC (57) ABSTRACT

The antenna on hand held devices, such as the iPhone or iPad, can be subject to interference from other circuitry on the device. Such interference may come from high frequency switching of nearby display circuitry, such as de-multiplexors or other circuits. To address this issue, the switching rates may be slowed in certain circuits by adding resistance and/or capacitance, thus raising the RC time constant and slowing the switching times to reduce the high frequency components. Alternatively or in addition to, an EMI shield can be placed over some or all of the display driving circuitry to shield the antenna from high frequency interference.

16 Claims, 10 Drawing Sheets

INTERFERENCE REDUCTION SYSTEMS AND METHODS

BACKGROUND

The present disclosure relates generally to reducing antenna interference from circuitry on an electronic device and, more particularly, to reducing interference from nearby display circuitry.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Handheld electronic devices increasingly incorporate a multitude of high frequency components, such as fast-switching display circuitry. These high frequency components may create noise that can mix with the radio frequency (RF) transmitter of the handheld electronic device, thus causing antenna interference. For example, antenna interference in a handheld cellular phone, such as a model of the iPhone® available from Apple Inc., may cause reduced call quality, increased bit error rate, increased signal to noise ratio, and dropped calls.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to devices and methods for reducing antenna interference from high frequency components. Handheld electronic devices include high frequency components that may interfere with the operation of the antenna in the handheld electronic device. In particular, the handheld electronic device may include display circuitry capable of high frequency switching that may create interference in the handheld electronic device.

In some embodiments, resistance and/or capacitance may be added to the high frequency display circuitry to slow the switching rates and reduce the antenna interference caused by the display circuitry. Alternatively or in addition to, an electromagnetic interference (EMI) shield can be placed over some or all of the display driving circuitry to decrease high frequency interference with the antenna of the handheld electronic device.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
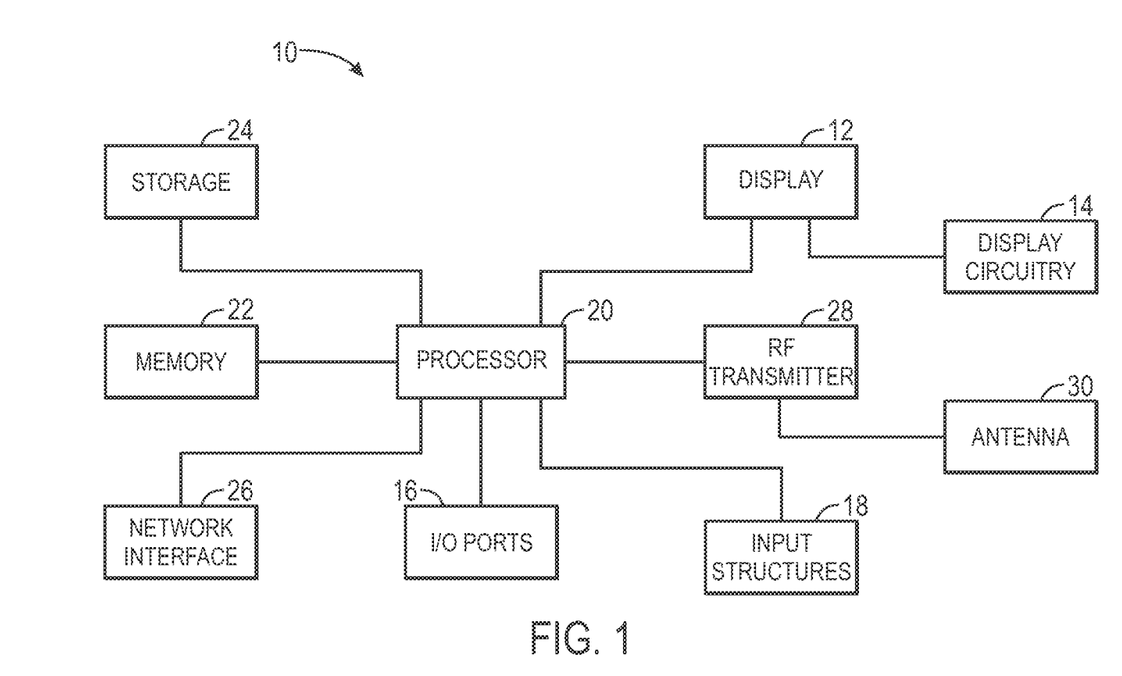
FIG. 1 is a schematic block diagram of an electronic device capable of performing the disclosed techniques, in accordance with an embodiment.

As may be appreciated, electronic devices may include various components that contribute to the function of the device. For instance, FIG. 1 is a block diagram illustrating components that may be present in one such electronic device 10. Those of ordinary skill in the art will appreciate that the various functional blocks shown in FIG. 1 may include hardware elements (including circuitry), software elements (including computer code stored on a computer-readable medium, such as a hard drive or system memory), or a combination of both hardware and software elements. FIG. 1 is only one example of a particular implementation and is merely intended to illustrate the types of components that may be present in the electronic device 10. For example, in the presently illustrated embodiment, these components may include a display 12 controlled by display circuitry 14, input/output (I/O) ports 16, input structures 18, one or more processors 20, one or more memory devices 22, non-volatile storage 24, networking device 26, radio frequency (RF) transmitter 28, and an antenna 30.

The display 12 may be used to display various images generated by electronic device 10. The display 12 may be any suitable display, such as a liquid crystal display (LCD) or an organic light-emitting diode (OLED) display. Additionally, in certain embodiments of the electronic device 10, the display 12 may be provided in conjunction with a touch-sensitive element, such as a touch-screen, that may be used as part of the control interface for the electronic device 10. For example, a touch-screen capable display 12 may include a touch-screen panel having an arrangement of electrodes. The display 12 may include a matrix of pixels and circuitry for modulating the transmittance of light through each pixel to display an image.

Figure 2:
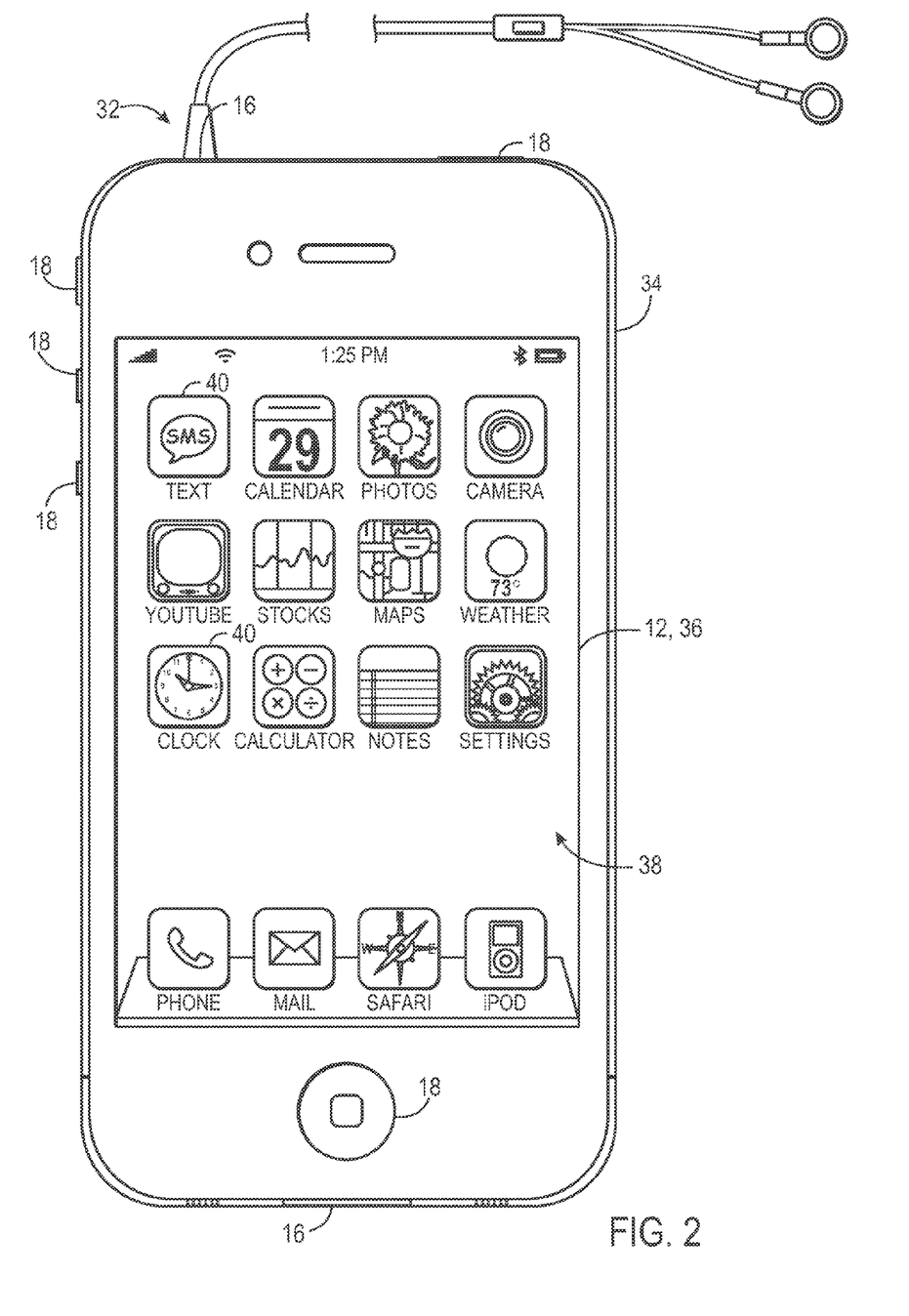
FIG. 2 is a perspective view of a handheld electronic device having the capabilities of the electronic device of FIG. 1, in accordance with an embodiment.

The electronic device 10 may take the form of a cellular telephone or some other type of electronic device. In certain embodiments, electronic device 10 in the form of a handheld electronic device may include a model of an iPhone® available from Apple Inc. of Cupertino, Calif. By way of example, an electronic device 10 in the form of a handheld electronic device 32 (e.g., a cellular telephone) is illustrated in FIG. 2 in accordance with one embodiment. The depicted handheld electronic device 32 includes a housing 34, a display 12 (e.g., in the form of an LCD or some other suitable display), I/O ports 16, and input structures 18.

Although an electronic device 10 is generally depicted in the context of a cellular phone in FIG. 2, an electronic device 10 may also take the form of other types of electronic devices. In some embodiments, various electronic devices 10 may include media players, personal data organizers, handheld game platforms, cameras, and combinations of such devices. For instance, the device 10 may be provided in the form of handheld electronic device 32 that includes various functionalities (such as the ability to take pictures, make telephone calls, access the Internet, communicate via email, record audio and video, listen to music, play games, and connect to wireless networks). In the depicted embodiment, the handheld electronic device 32 includes the display 12, which may be in the form of an LCD 36. The LCD 36 may display various images generated by the handheld electronic device 32, such as a graphical user interface (GUI) 38 having one or more icons 40. A user may perform various functions using touch-screen technology by touching a top surface of a touch-sensitive LCD 36 and accessing the GUI 38.

In another embodiment, the electronic device 10 may also be provided in the form of a portable multi-function tablet computing device (not illustrated). In certain embodiments, the tablet computing device may provide the functionality of two or more of a media player, a web browser, a cellular phone, a gaming platform, a personal data organizer, and so forth. By way of example only, the tablet computing device may be a model of an iPad® tablet computer, available from Apple Inc.

In embodiments in which the handheld electronic device 32 includes an LCD 36, the LCD 36 may include a display panel having an array or matrix of picture elements (i.e., pixels). In operation, the LCD 36 generally operates to modulate the transmission of light through the pixels by controlling the orientation of liquid crystal disposed at each pixel. In general, the orientation of the liquid crystals is controlled by a varying an electric field associated with each respective pixel, with the liquid crystals being oriented at any given instant by the properties (strength, shape, and so forth) of the electric field.

Different types of LCDs may employ different techniques in manipulating these electrical fields and/or the liquid crystals. For example, certain LCDs employ transverse electric field modes in which the liquid crystals are oriented by applying an in-plane electrical field to a layer of the liquid crystals. Example of such techniques include in-plane switching (IPS) and fringe field switching (FFS) techniques, which differ in the electrode arrangement employed to generate the respective electrical fields.

While control of the orientation of the liquid crystals in such displays may be sufficient to modulate the amount of light emitted by a pixel, color filters may also be associated with the pixels to allow specific colors of light to be emitted by each pixel. For example, in embodiments where the LCD 36 is a color display, each pixel of a group of pixels may correspond to a different primary color. For example, in one embodiment, a group of pixels may include a red pixel, a green pixel, and a blue pixel, each associated with an appropriately colored filter. The intensity of light allowed to pass through each pixel (by modulation of the corresponding liquid crystals), and its combination with the light emitted from other adjacent pixels, determines what color(s) are perceived by a user viewing the display. As the viewable colors are formed from individual color components (e.g., red, green, and blue) provided by the colored pixels, the colored pixels may also be referred to as unit pixels.

Figure 3:
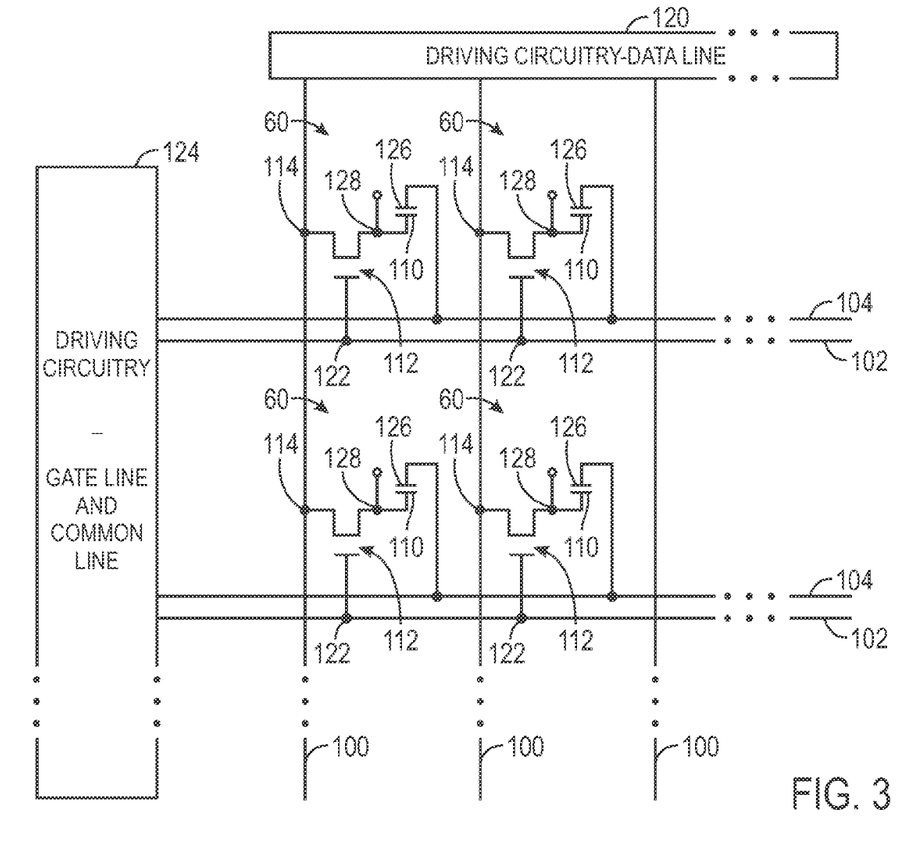
FIG. 3 is a circuit diagram of display circuitry of LCD pixels, in accordance with aspects of the present disclosure.

Referring now to FIG. 3, an example of a circuit view of display circuitry 14 found in an LCD 36 is provided. As depicted, the pixels 60 may be disposed in a matrix that forms an image display region of an LCD 36. In such a matrix, each pixel 60 may be generally defined by the intersection of data or source lines (or "wires") 100 and scanning or gate lines (or "wires") 102. The pixel array may also include common lines (or "wires") 104 to apply voltages to common electrodes of the pixel array.

In this example, each pixel 60 includes a pixel electrode 110 and thin film transistor (TFT) 112 for switching the pixel electrode 110. In the depicted embodiment, the source 114 of each TFT 112 is electrically connected to a data line 100, extending from respective data line driving circuitry 120. Similarly, in the depicted embodiment, the gate 122 of each TFT 112 is electrically connected to a scanning or gate line 102, extending from driving circuitry 124. In addition to circuitry for driving the gate lines 102, the driving circuitry 124 also includes common line driving circuitry to apply voltages to the common lines 104, which allow such voltages to be applied to common electrodes 126. In the depicted embodiment, the pixel electrode 110 is electrically connected to a drain 128 of the respective TFT 112.

In one embodiment, the data line driving circuitry 120 sends image or data signals to the pixels via the respective data lines 100. Such image signals may be applied by line-sequence, i.e., the data lines 100 may be sequentially activated during operation. The scanning lines 102 may apply scanning signals from the driving circuitry 124 to the gate 122 of each TFT 112 to which the respective scanning lines 102 connect. Such scanning signals may be applied by line-sequence with a predetermined timing and/or in a pulsed manner.

Each TFT 112 serves as a switching element which may be activated and deactivated (i.e., turned on and off) for a predetermined period based on the respective presence or absence of a scanning signal at the gate 122 of the TFT 112. When activated, a TFT 112 may store the image signals received via a respective data line 100 as a charge in the pixel electrode 110 with a predetermined timing.

It may be appreciated that the data line driving circuitry 120 may include de-multiplexors that receive a multiplexed data signal from the data lines 100 and selectively switch unit pixels (e.g., red, green, and blue pixels) on and off very fast. When the gate activation signal and/or the data line signal transitions to cause a TFT to switch between on and off states, rise and fall transition time properties (e.g., slew rate) of the gate activation signal and/or data signal may affect a noise level or interference level with the antenna 30 of the electronic device 10. Faster transition times may increase noise level, thus causing antenna interference.

Figure 4A:
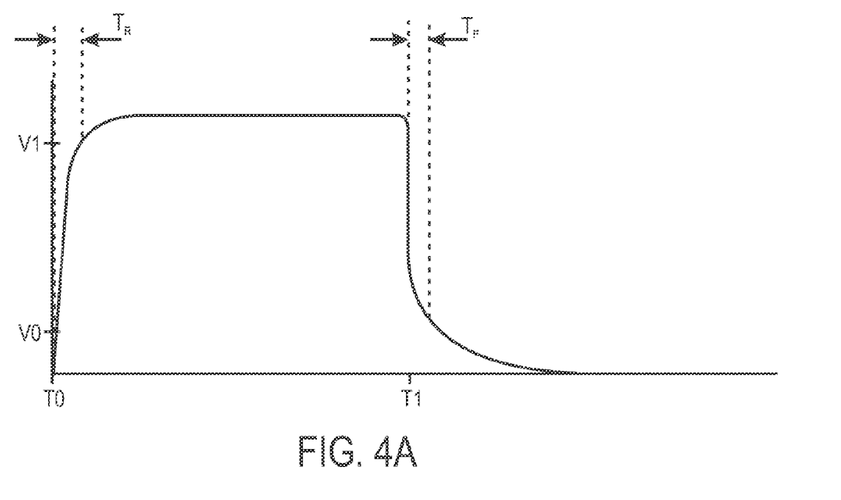
FIG. 4A is a diagram showing the slew rate of the rising and falling edges of an output voltage signal of the display circuitry of FIG. 3.

The transition time for switching pixels on and off is not instantaneous, but rather occurs over a period of time. As commonly recognized in the art, when referring to slew rates, a transition time may sometimes be defined as the time required for an output signal to transition from 10 percent to 90 percent in response to a step or change in an input signal, and is usually expressed in units of volts per unit time (e.g., millisecond, microsecond, etc.) FIG. 4A generally illustrates the slew rate of an output signal voltage, such as a signal from a de-multiplexor, data line, or common voltage line, found in the fast switching display circuitry 14 of FIG. 3. In the present example, V0 and V1 may represent voltages that are 10 percent and 90 percent of the output signal voltage 130. Accordingly, the slew rate for the rising edge, transitioning at time T0, may correspond to the time represented by interval $t_R$. Similarly, at time T1, the output signal voltage 130 transitions from 90 percent to 10 percent. Here, the slew rate for the falling edge of the output signal voltage 130 may correspond to the time represented by interval $t_F$.

The rise and fall slew rates of the output signal voltage 130 corresponding to the rise and fall intervals $t_R$ and $t_F$, respectively, may be determined as a function of the RC time constant ($\tau$). As can be appreciated, the RC time constant may correspond to the product of the display circuitry resistance ($R_{circuit}$) and display circuitry capacitance ($C_{circuit}$), or $\tau = R_{circuit} \times C_{circuit}$. As such, the rise and fall slew rates shown in FIG. 4A may be increased or decreased by varying the resistance and capacitance values.

Figure 4B:
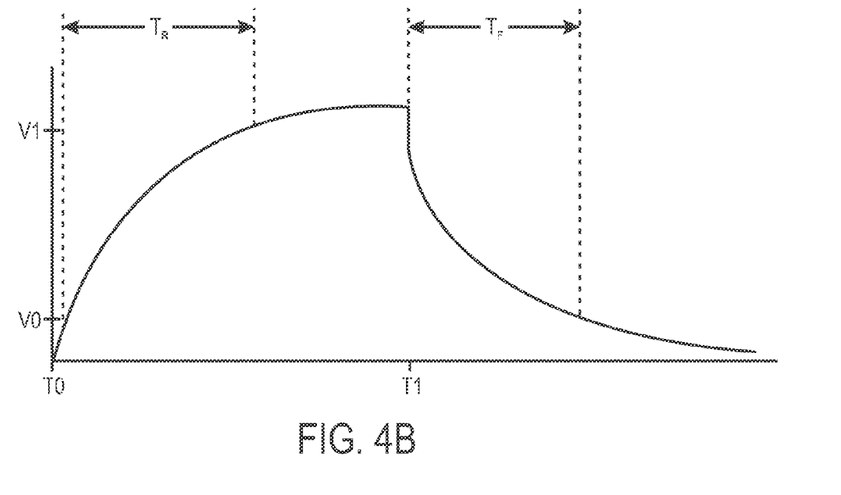
FIG. 4B is a diagram showing the slew rate of the rising and falling edges of an output voltage signal of the display circuitry of FIG. 3, when the display circuitry is configured with additional resistance and/or capacitance.

For example, the rising edge slew rate $t_R$ and falling edge slew rate $t_F$ may be slowed by adding additional resistance ($R_{control}$) and/or capacitance ($C_{control}$). In this case, the RC time constant may correspond to $\tau = (R_{circuit} + R_{control}) \times (C_{circuit} + C_{control})$. FIG. 4B generally illustrates the slew rate of an output signal voltage 132, which is configured with additional resistance and/or capacitance. As illustrated, the additional resistance and/or capacitance increases the RC time constant of the output signal voltage 132, and thus causes the rising edge slew rate $t_R$ and the falling edge slew rate $t_F$ to slow.

In some embodiments, the antenna interference, caused by fast pixel switching, may be controlled by slowing the slew rate of the de-multiplexor, the data signals, and/or the common voltage. As previously discussed, the slew rates of these components may be adjusted by altering the resistance and/or capacitance (i.e., the RC time constant) of these components. Adding control resistance and/or control capacitance increases the RC time constant and, thus, slows the slew rate and reduces the high frequency components that can produce the interference.

Figure 5A:
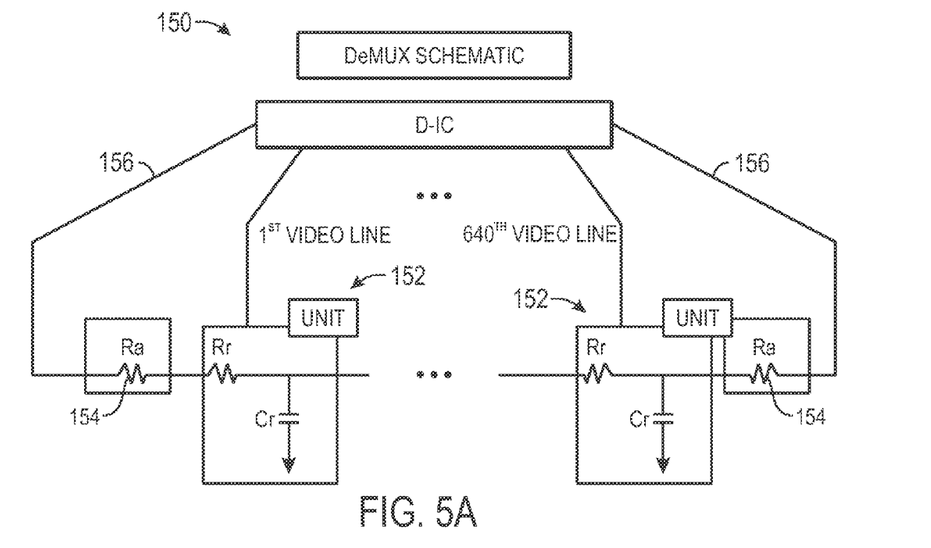
FIG. 5A is a schematic view of a display circuitry of the handheld electronic device, configured with fast switching de-multiplexors, illustrating control resistance added to the de-multiplexor routing area to reduce antenna interference.

For example, FIG. 5A illustrates a schematic view of a display circuitry 150 of the electronic device 10, which is configured with fast switching de-multiplexors 152. For example, in some embodiments, the de-multiplexor slew rate may be approximately between 20-100 nanoseconds. The slew rate of the de-multiplexors 152 may be decreased by adding control resistance 154 to the de-multiplexor control line 156 that determines the de-multiplexor routing path (e.g., red, green, or blue pixel path). For example, in some embodiments, the de-multiplexor slew rate may be slowed to between 200-1000 nanoseconds. Adding control resistance 154 to the control line 156 increases the RC time constant of the de-multiplexors 152, thus causing their slew rates to decrease. In some embodiments, the control resistance 154 added to the control line 156 may be between 1-12 kilo-ohms. In one simulation, adding a control resistance of 4.2 kilo-ohms was found to slow the rising edge slew rate from approximately 46 nanoseconds to approximately 500 nanoseconds.

Figure 5B:
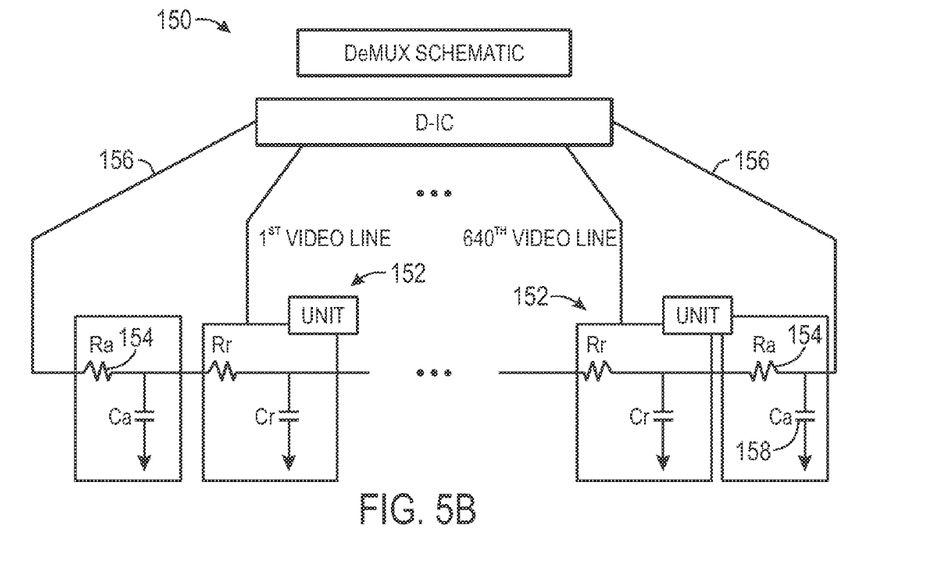
FIG. 5B is a schematic view of a display circuitry similar to FIG. 3, illustrating control capacitance added to the de-multiplexor routing area to reduce antenna interference.

In addition to adding control resistance 154 to the de-multiplexor control line 156, FIG. 5B depicts display circuitry 150 with slew-rate control capacitance 158 incorporated into the de-multiplexor control line 156. Adding control capacitance 158 to the de-multiplexor control line 156 may also increase the RC time constant, and thus slow the slew rate of the de-multiplexors 152. As illustrated in FIG. 5B, control resistance 154 and control capacitance 158 may be added in combination to the de-multiplexor control line 156 to slow the slew rate of the de-multiplexors 152. In some embodiments (not illustrated), control capacitance 158 may be added without control resistance 154.

In addition to controlling the high frequency interference by slowing the slew rate of the de-multiplexor, in one or more embodiments, the high frequency interference may be controlled by slowing the slew rate of the data signals in the display circuitry. The slew rate of the data signals may be slowed by adding control resistance and/or control capacitance to the data lines of the display circuitry. As control resistance and/or control capacitance is added, the transition rate of data signal is reduced, as are the high frequency components that cause the interference.

Figure 6A:
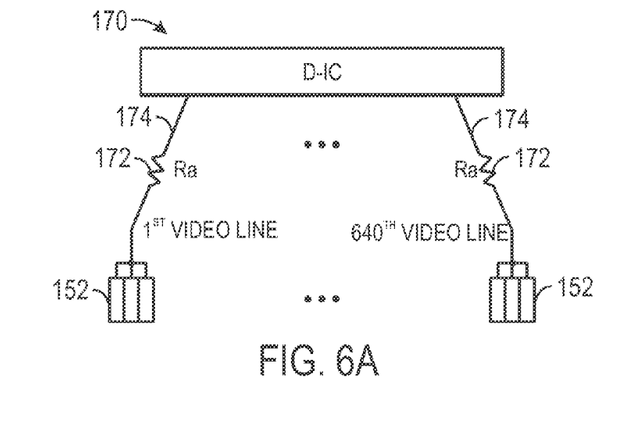
FIG. 6A is a schematic view of a display circuitry of the handheld electronic device, illustrating control resistance added to the data lines to reduce antenna interference.

For example, FIG. 6A illustrates display circuitry 170 with control resistance 172 added to the data signal lines 174. The data signal lines 174 provide a signal to the de-multiplexors 152 to switch on or off the red, green, and blue paths. By adding control resistance 172 to the data signal lines 174, the data signal slew rate may be decreased, thus decreasing noise that may interfere with the antenna 30 of the electronic device 10.

Figure 6B:
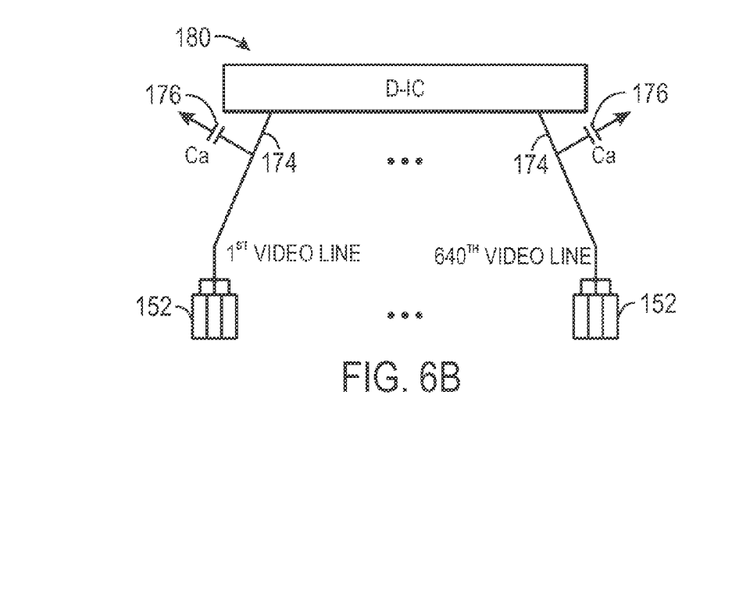
FIG. 6B is a schematic view of display circuitry of the handheld electronic device of FIG. 2, illustrating control capacitance added to the data lines to reduce antenna interference.

As an alternative to adding control resistance 172 to slow the slew rate of the data signal, control capacitance 176 may be added to the data lines 174 to slow the data signal slew rate. For example, FIG. 6B illustrates display circuitry 180 with additional control capacitance 176. The control capacitance 176 is added to the data lines 174 to slow the transition rates of the data lines 174. By decreasing the slew rate of the data lines 174, high frequency noise may be reduced, resulting in less antenna interference.

Figure 6C:
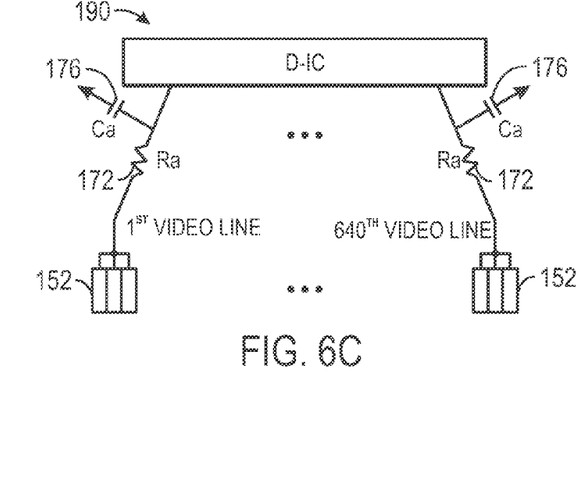
FIG. 6C is a schematic view of display circuitry of the handheld device of FIG. 2, illustrating control resistance and control capacitance added to the data lines to reduce antenna interference.

It is also possible to add both control resistance 172 and control capacitance 176 to the data lines 174 to slow the data signal slew rate. In the alternative embodiment of the data circuitry 190 depicted in FIG. 6C, a combination of control resistance 172 and control capacitance 176 is added to the data lines 174 to decrease antenna interference. As the data signal transition rate is slowed by the control resistance 172 and control capacitance 176, the amount of high frequency noise emitted from the display circuitry is reduced. The reduced high frequency noise may result in less antenna interference.

Figure 7A:
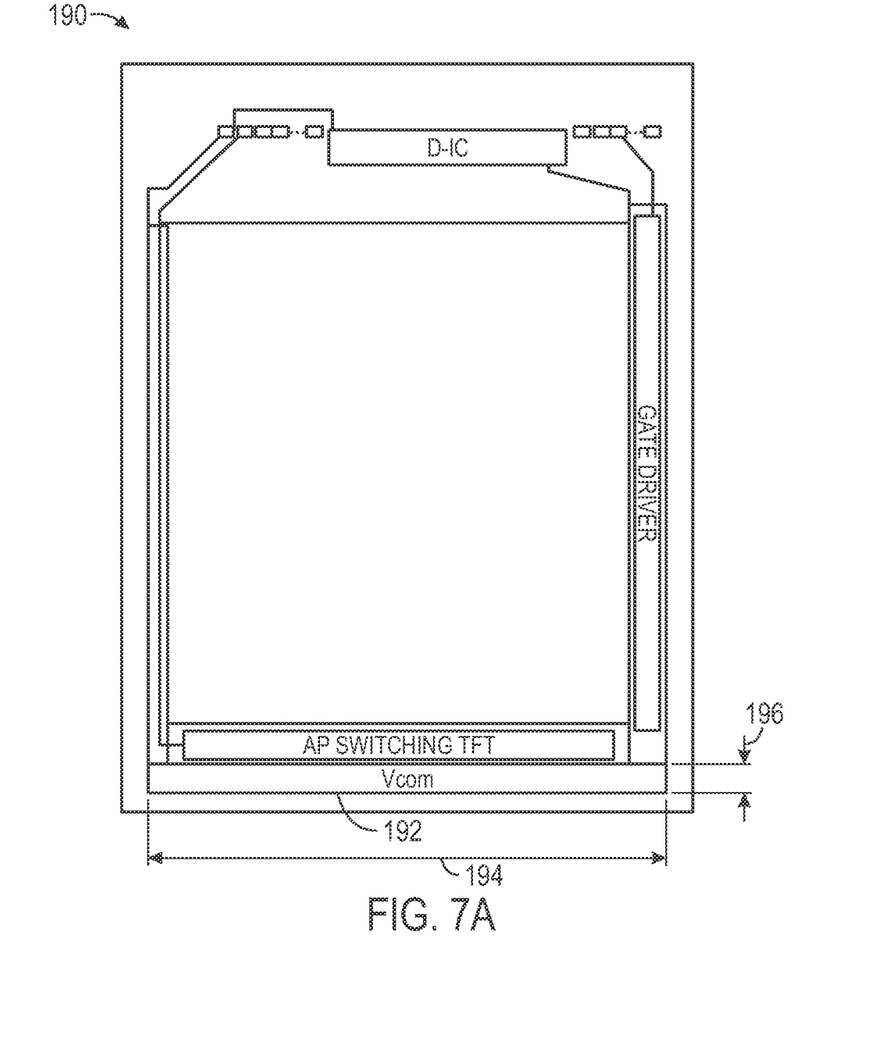
FIG. 7A is a schematic view of a display circuitry with a common voltage (VCOM) contact.

The common voltage contact of the handheld electronic device may also cause antenna interference. FIG. 7A illustrates a display circuitry 190 with a singular common voltage contact 192 having a standard width 194 and thickness 196. By altering the common voltage contact, the RC time constant values may be increased, thus slowing the common voltage slew rate. For example, resistance may be added to the common voltage contact by decreasing the amount of conductive materials making up the common voltage contact, decreasing the thickness of the common voltage contact, and/or adding control capacitance to the common voltage contact. The increased resistance increases the RC time constant, and thus decreases the slew rate, which may reduce antenna interference.

Figure 7B:
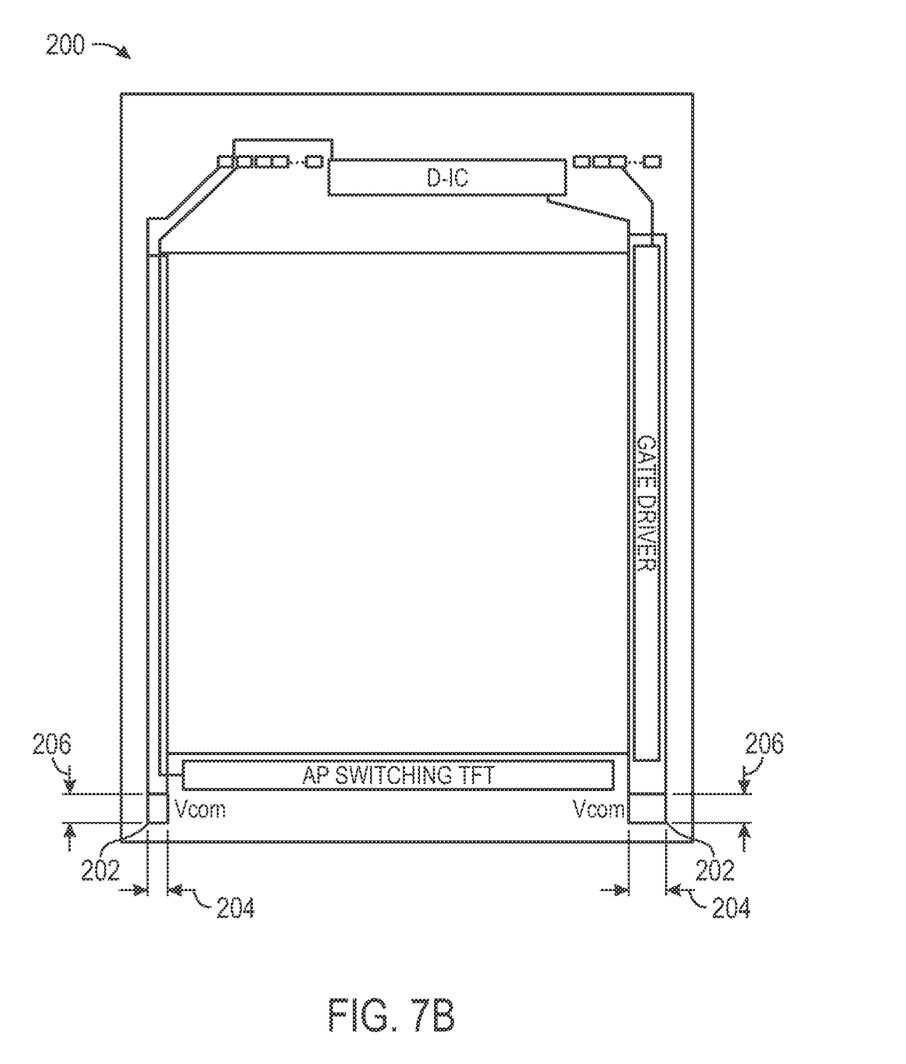
FIG. 7B is a modified version of the display circuitry of FIG. 7A where the common voltage is separated into two smaller common voltage contacts, creating control resistance to reduce antenna interference.
Figure 7C:
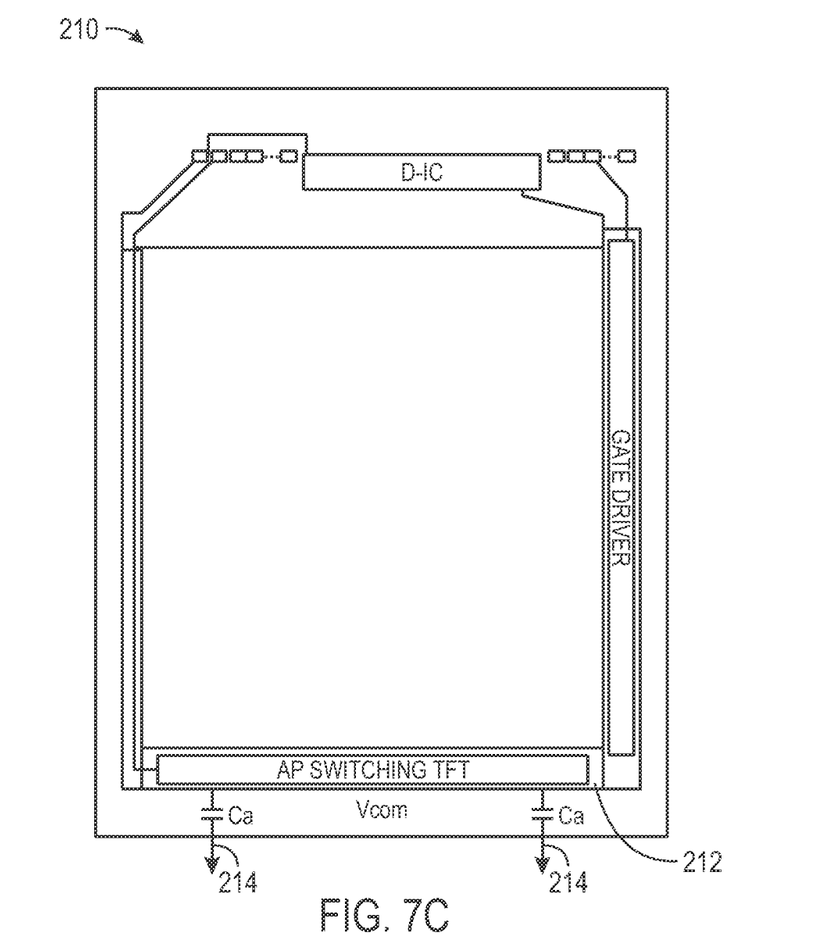
FIG. 7C is a modified version of the display circuitry of FIG. 7A where a thin common voltage contact is utilized to increase control resistance, and where control capacitance is added, to reduce antenna interference.

For example, as shown in the display circuitry 200 of FIG. 7B, the standard common voltage contact 192 of FIG. 7A may be divided into multiple common voltage contacts 202 that have a smaller width 204 and/or thickness 206 as compared to the singular common voltage contact 192. Dividing the singular common voltage contact 192 may result in increased resistance, thus increasing the RC time constant and slowing the slew rate of the common voltage. Resistance may also be added to the singular common voltage contact 192 by narrowing the common voltage contact. FIG. 7C illustrates a modified display circuitry 210 where the common voltage contact 212 is significantly more narrow than the singular common voltage contact 192 of FIG. 7A, thus creating more resistance. Additionally, control capacitance 214 may be added to the common voltage contact 212. Increasing the control resistance and/or control capacitance 214 of the common voltage contact 212 will result in a higher RC time constant and a slower slew rate of the common voltage. The slower slew rate may decrease the amount of high frequency noise that may interfere with the antenna 30 of the electronic device 10.

It may be desirable to dynamically change the slew rate based on a detected need. In some embodiments, control resistance and/or capacitance may be selectively added during the operation of the electronic device 10 to control detected interference. For example, the processor 20 of the electronic device 10 may be configured with instructions to detect interference from the display circuitry 14. In one embodiment, the processor 20 may detect an increased bit error rate, increased signal noise, reduced call quality, and/or dropped calls. Upon detection of interference, the processor 20 may selectively add control resistance (154, 172) and/or control capacitance (158, 176, 214) to the de-multiplexor 152, the data signal lines 174, and/or the common voltage contact 212 to slow the respective slew rates. For example, the processor 20 may redirect the de-multiplexor control line 156, the data lines 174, and/or the common voltage lines to pathways that incorporate additional resistance and/or capacitance. Resistance and/or capacitance may be added in an incremental manner. In some embodiments, the processor 20 may detect interference, add resistance and/or capacitance, and if interference is still detected, add additional resistance and/or capacitance until the interference is no longer detected.

Figure 8:
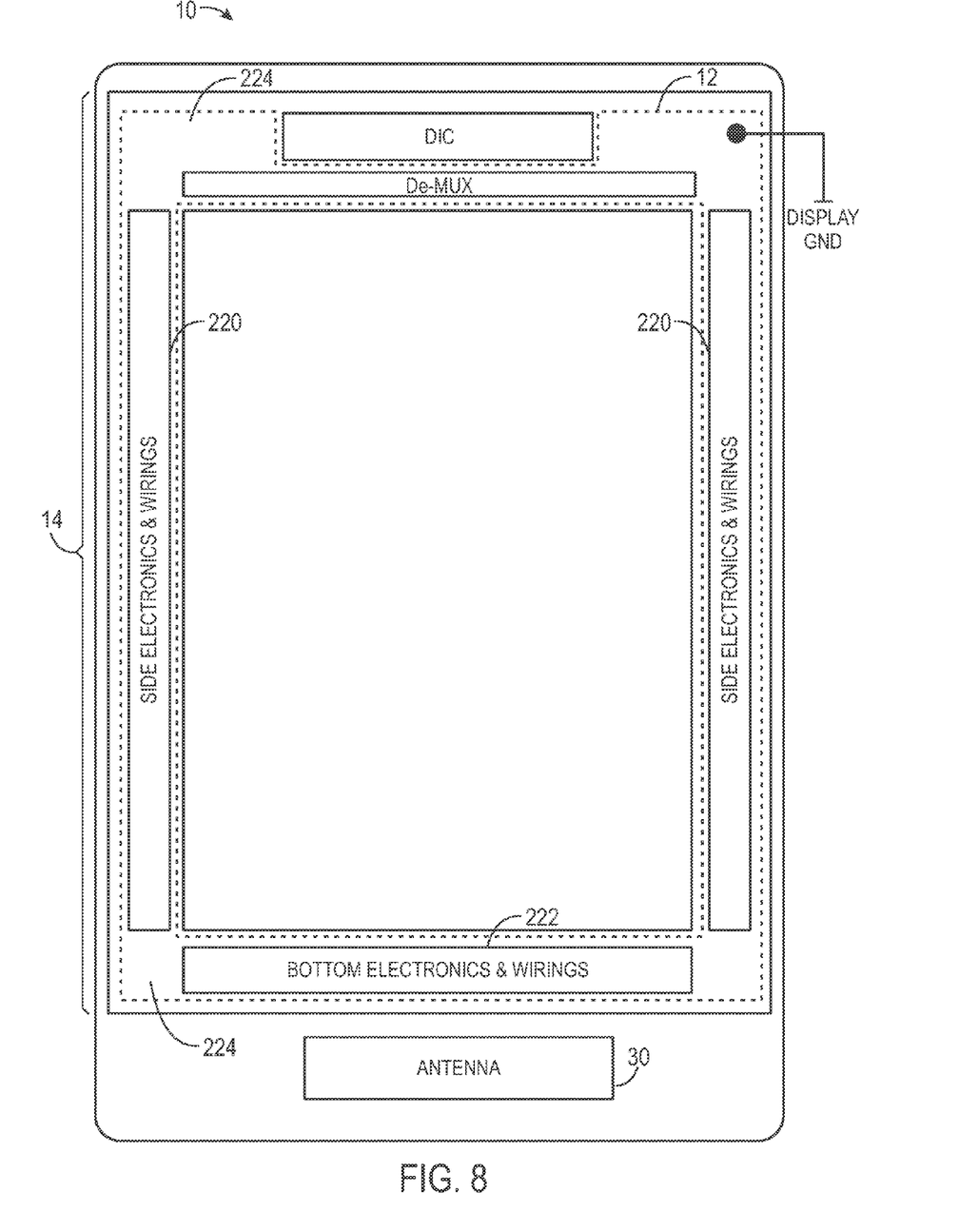
FIG. 8 is a schematic view of the handheld electronic device of FIG. 2 with an integrated ground shield to reduce antenna interference.

In some embodiments, interference from the display circuitry 14 may be reduced by a ground shield that surrounds the periphery of the display 12. For example, FIG. 8 illustrates an electronic device 10 with display circuitry 14 and antenna 30. The electronic device 10 includes side electronics and wirings 220 as well as bottom electronics and wirings 222. An electromagnetic interference (EMI) shield 224 is positioned around the display circuitry 14, including the side electronics and wiring 220, and the bottom electronics and wirings 222. The EMI shield 224 is not positioned around antenna 30 to prevent high frequency noise coupling with the antenna 30.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising:
    an antenna configured to communicate radio frequency transmissions;
    high frequency display circuitry configured to display an image on the electronic device; and
    at least one of control capacitance and control resistance configured to be selectively activated to control a slew rate of the high frequency display circuitry to reduce a communication interference with the antenna caused by the high frequency display circuitry;
    wherein:
        the high frequency display circuitry comprises one or more de-multiplexors configured to receive a multiplexed data signal over a control line and selectively switch pixels of the high frequency display circuitry on and off and the at least one of the control capacitance and the control resistance is disposed on the control line to control a slew rate of the one or more de-multiplexors; or
        the high frequency display circuitry comprises a common voltage contact configured to supply a common voltage to a common electrode of the high frequency display circuitry and the control resistance is configured to control a slew rate of the common voltage; or
        a combination thereof.

2. The electronic device of claim 1, wherein the at least one of the control capacitance and the control resistance is configured to slow the slew rate of the one or more de-multiplexors to a range of approximately 200-1000 nanoseconds.

3. The electronic device of claim 1, wherein the high frequency display circuitry comprises one or more data lines configured to supply image or data signals to pixels of the electronic device; and
    wherein the at least one of the control capacitance and the control resistance is disposed on the one or more data lines to control a slew rate of the one or more data lines.

4. The electronic device of claim 1, comprising the control resistance, wherein the control resistance ranges between 1 to 12 kilo-ohms.

5. The electronic device of claim 1, wherein the control resistance comprises a resistance created by reducing an amount of conductive material in the common voltage contact.

6. The electronic device of claim 5, wherein the common voltage contact is divided into a plurality of common voltage contacts with a reduced width or thickness to increase the control resistance.

7. The electronic device of claim 1, wherein a thickness of the common voltage contact is reduced to increase the control resistance.

8. The electronic device of claim 7, comprising:
    control capacitance disposed on the common voltage contact to control the slew rate of the common voltage.

9. An electronic device comprising:
    an antenna configured to communicate radio frequency transmissions
    high frequency display circuitry configured to display an image on the electronic device; and at least one of control capacitance and control resistance configured to be selectively activated to control a slew rate of the high frequency display circuitry to reduce a communication interference with the antenna caused by the high frequency display circuitry; and a processor configured to detect the communication interference caused by the high frequency display circuitry and activate the at least one of the control capacitance and the control resistance based upon the detection of the communication interference; wherein the high frequency display circuitry comprises one or more data lines configured to supply image or data signals to pixels of the electronic device; and wherein the at least one of the control capacitance and the control resistance is disposed on the one or more data lines to enable control of a slew rate of the one or more data lines.

10. The electronic device of claim 9, wherein the processor is configured to detect at least one of a bit error rate, increased signal noise, reduced call quality, and dropped calls; wherein the at least one of the bit error rate, increased signal noise, reduced call quality and dropped calls are representative of the communication interference.

11. The electronic device of claim 9, wherein the processor is configured to deactivate the at least one of the control capacitance and the control resistance when no radio frequency transmissions are being communicated by the antenna.

12. The electronic device of claim 9, wherein the processor is configured to activate the at least one of the control capacitance and the control resistance in an incremental manner until a slew rate of one or more de-multiplexors in the high frequency display circuitry is reduced to between 200-1000 nanoseconds.

13. The electronic device of claim 9, wherein the processor is configured to activate the at least one of the control capacitance and the control resistance in an incremental manner until the processor no longer detects the communication interference.

14. The electronic device of claim 9, wherein the high frequency display circuitry comprises one or more de-multiplexors configured to receive a multiplexed data signal over a control line and selectively switch pixels of the high frequency display circuitry on and off; and wherein the at least one of the control capacitance and the control resistance is disposed on the control line to enable control of a slew rate of the one or more de-multiplexors.

15. The electronic device of claim 9, wherein the high frequency display circuitry comprises a common voltage contact configured to supply a common voltage to a common electrode of the high frequency display circuitry; and wherein the control capacitance is disposed on the common voltage contact to enable control of a slew rate of the common voltage.

16. An electronic device comprising:
an antenna configured to communicate radio frequency transmissions;
high frequency display circuitry configured to display an image on the electronic device; and an electromagnetic interference shield disposed around the high frequency display circuitry of the electronic device but not disposed around the antenna;
wherein the electromagnetic interference shield is configured to reduce noise coupling between the antenna and the high frequency display circuitry to reduce a communication interference with the antenna caused by the high frequency display circuitry; and wherein the high frequency display circuitry comprises one or more de-multiplexors configured to receive a multiplexed data signal over a control line and selectively switch pixels of the high frequency display circuitry on and off and control capacitance, control resistance, or both is disposed on the control line to control a slew rate of the one or more de-multiplexors; or the high frequency display circuitry comprises a common voltage contact configured to supply a common voltage to a common electrode of the high frequency display circuitry and a control resistance is configured to control a slew rate of the common voltage; or both, such that the communication interference is reduced.

* * * * *